(12) United States Patent
Kim et al.

(10) Patent No.: US 10,111,104 B2
(45) Date of Patent: Oct. 23, 2018

(54) METHOD FOR MEASURING SUBBAND IN WIRELESS COMMUNICATION SYSTEM, AND APPARATUS THEREFOR

(71) Applicant: LG Electronics Inc., Seoul (KR)

(72) Inventors: Eunsun Kim, Anyang-si (KR);
Byounghoon Kim, Anyang-si (KR);
Kijun Kim, Anyang-si (KR)

(73) Assignee: LG Electonics Inc., Seoul (KR)

( * ) Notice: Subject to any disclaimer, the term of this patent is extended or adjusted under 35 U.S.C. 154(b) by 0 days.

(21) Appl. No.: 14/655,478

(22) PCT Filed: Jun. 21, 2013

(86) PCT No.: PCT/KR2013/005498
§ 371 (c)(1),
(2) Date: Jun. 25, 2015

(87) PCT Pub. No.: WO2014/104505
PCT Pub. Date: Jul. 3, 2014

(65) Prior Publication Data
US 2015/0341803 A1 Nov. 26, 2015

Related U.S. Application Data

(60) Provisional application No. 61/746,098, filed on Dec. 26, 2012.

(51) Int. Cl.
*H04W 24/02* (2009.01)
*H04W 16/02* (2009.01)
(Continued)

(52) U.S. Cl.
CPC ............ *H04W 16/02* (2013.01); *H04L 5/005* (2013.01); *H04L 5/006* (2013.01); *H04L 5/0035* (2013.01);
(Continued)

(58) Field of Classification Search
CPC ..................................................... H04W 24/02
See application file for complete search history.

(56) References Cited

U.S. PATENT DOCUMENTS 9,119,164 B2 * 8/2015 Yavuz ................. H04W 52/244
2005/0026622 A1 * 2/2005 Georgeaux ............ H04W 48/02
455/450

(Continued)

FOREIGN PATENT DOCUMENTS

| KR | 10-2011-0111366 A | 10/2011 |
|---|---|---|
| WO | 2009-120902 A1 | 10/2009 |
| WO | 2011-056770 A1 | 5/2011 |
| WO | 2012-037387 A1 | 3/2012 |

*Primary Examiner* — John Blanton
(74) *Attorney, Agent, or Firm* — Dentons US LLP

(57) ABSTRACT

According to one embodiment of the present invention, disclosed is a method for measuring a subband by pico base station(s) located within a coverage of a macro base station in a wireless communication system. The method is performed by a first pico base station, and comprises the steps of: receiving beacon signals from other pico base station(s) in the coverage of the macro base station via each subband of all the subbands of the whole band of the wireless communication system, and measuring the receiving quality of the beacon signal received via each subband; determining whether to select at least one subband from among said all subbands based on the measured receiving quality of the beacon signal; and transmitting, if at least one subband is selected, the beacon signal via the selected at least one subband.

6 Claims, 11 Drawing Sheets

(51) Int. Cl.
    *H04W 16/32*      (2009.01)
    *H04W 74/08*      (2009.01)
    *H04L 5/00*       (2006.01)
    *H04W 72/04*      (2009.01)
    *H04W 72/08*      (2009.01)
    *H04W 40/24*      (2009.01)
    *H04W 84/04*      (2009.01)

(52) U.S. Cl.
    CPC ........... *H04L 5/0057* (2013.01); *H04W 16/32* (2013.01); *H04W 24/02* (2013.01); *H04W 72/0453* (2013.01); *H04W 72/085* (2013.01); *H04W 74/0833* (2013.01); *H04L 5/001* (2013.01); *H04L 5/0023* (2013.01); *H04W 40/244* (2013.01); *H04W 84/045* (2013.01)

(56) References Cited

U.S. PATENT DOCUMENTS

| | | | | |
|---|---|---|---|---|
| 2010/0290405 | A1* | 11/2010 | Arnott | H04L 5/0094 370/329 |
| 2011/0267996 | A1* | 11/2011 | Guan | H04W 72/042 370/280 |
| 2012/0258730 | A1 | 10/2012 | Tinnakornsrisuphap et al. | |
| 2013/0010719 | A1* | 1/2013 | Shapira | H04W 72/082 370/329 |
| 2013/0070626 | A1* | 3/2013 | Gaal | H04W 48/16 370/252 |
| 2013/0121222 | A1* | 5/2013 | Luo | H04W 36/20 370/311 |
| 2014/0176365 | A1* | 6/2014 | Aryanfar | G01S 7/352 342/369 |

* cited by examiner $R_0$ : CRS for antenna port 0  $R_2$ : CRS for antenna port 2
$R_1$ : CRS for antenna port 1  $R_3$ : CRS for antenna port 3

METHOD FOR MEASURING SUBBAND IN WIRELESS COMMUNICATION SYSTEM, AND APPARATUS THEREFOR

This application is a 35 USC § 371 National Stage entry of International Application No. PCT/KR2013/005498 filed on Jun. 21, 2013 and claims priority to U.S. Provisional Application No. 61/746,098, filed Dec. 26, 2012, all of which are incorporated by reference in their entirety herein.

TECHNICAL FIELD

The present invention relates to a method for measuring a subband in a wireless communication system, and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

However, in the multi-node system, a scheme is needed to allocate a partial frequency band of a whole system band to multiple nodes. In particular, when a conventional frequency resource allocation scheme for a macro cell base station is applied without change to a wireless communication system in which small cell base stations (for example, pico cell or femto cell base stations, which will be hereinafter referred to as small base stations) are dispersed, introduction of the small base station may be less effective.

DISCLOSURE

Technical Problem

The present invention proposes a scheme for allocating or selecting a frequency resource of a small cell base station in a wireless communication system, in particular, in a macro cell coverage area.

In addition, the present invention proposes a scheme for measuring or sensing a subband to allocate or select a frequency resource of a small cell base station in a wireless communication system, in particular, in a macro cell coverage area.

In addition, the present invention proposes a scheme for measuring or sensing a partial subband of a whole system bandwidth in order to access a small cell base station in a wireless communication system, in particular, in a macro cell coverage area.

Technical problems to be solved by the present invention are not limited to the above-mentioned technical problems, and other technical problems not mentioned herein may be clearly understood by those skilled in the art from description below.

Technical Solution

According to an embodiment of the present invention, a method of measuring a subband of a pico base station located in a coverage area of a macro base station in a wireless communication system, the method being performed by a first pico base station, includes receiving beacon signals from other pico base stations in the coverage area of the macro base station in at least one subband of a whole band of the wireless communication system, measuring reception qualities of the received beacon signals, determining whether to select the at least one subband based on the measured reception qualities of the received beacon signals, and transmitting a beacon signal in the at least one subband when the at least one subband is selected.

Preferably, the beacon signals may include channel state information-reference signals (CSI-RSs).

Preferably, the beacon signals may be generated using a common cell identifier (ID) or a pico base station-specific cell ID.

Preferably, the method may further include transmitting subband switching instruction information to at least one user equipment (UE) connected to the first pico base station when the at least one selected subband is different from a previously selected subband.

Preferably, the subband switching instruction information may include information about the at least one selected subband and information about a time when switching to the at least one selected subband.

Preferably, the method may further include receiving the beacon signals from the other pico base stations in the coverage area of the macro base station in all respective subbands of the whole band and measuring reception qualities of beacon signals received in all the respective subbands simultaneously with transmitting the beacon signal in the at least one selected subband.

Preferably, the method may further include maintaining an idle state until a subsequent period in which the reception qualities of the beacon signals are to be measured when the at least one subband is not selected.

According to another embodiment of the present invention, a method of measuring subbands of pico base stations located in a coverage area of a macro base station in a wireless communication system, the method being performed by a UE, includes receiving beacon signals from the pico base stations in at least one subband of a whole band of the wireless communication system, measuring reception qualities of the beacon signals received in the at least one subband, selecting the at least one subband based on the measured reception qualities of the beacon signals, transmitting a random access preamble in the at least one selected subband, and receiving a random access response including a dedicated cell identifier (ID) and an ID allocated to the UE in the at least one subband in response to the random access preamble.

Preferably, the beacon signals may include CSI-RSs.

Preferably, the beacon signals may be generated using a common cell ID or a pico base station-specific cell ID.

Preferably, the method may further include receiving subband switching instruction information from at least one pico base station which transmits a downlink signal in the at least one selected subband when the at least one pico base station selects another subband.

Preferably, the subband switching instruction information may include information about the at least one selected subband and information about a time when switching to the at least one selected subband.

According to another embodiment of the present invention, a pico base station configured to measure a subband of a pico base station located in a coverage area of a macro base station in a wireless communication system, includes a radio frequency (RF) unit, and a processor configured to control the RF unit, wherein the processor is configured to receive beacon signals from other pico base stations in the coverage area of the macro base station in all respective subbands of a whole band of the wireless communication system and measure reception qualities of beacon signals received in all the respective subbands, determine whether to select at least one subband from among all the subbands based on the measured reception qualities of the beacon signals, and transmit a beacon signal in the at least one subband when the at least one subband is selected.

According to another embodiment of the present invention, a UE configured to measure subbands of pico base stations located in a coverage area of a macro base station in a wireless communication system, includes an RF unit, and a processor configured to control the RF unit, wherein the processor is configured to receive beacon signals from the pico base stations in all respective subbands of a whole band of the wireless communication system and measure reception qualities of the beacon signals received in all the respective subbands, select at least one subband from among all the subbands based on the measured reception qualities of the beacon signals, transmit a random access preamble in the at least one selected subband, and receive a random access response including a dedicated cell identifier (ID) and an ID allocated to the UE in the at least one subband in response to the random access preamble.

It should be noted that the above-mentioned technical solutions are merely a part of embodiments of the present invention, and various embodiments reflecting technical characteristics of the present invention may be derived and understood by those skilled in the art from detailed description of the present invention given below.

Advantageous Effects

According to embodiment(s) of the present invention, it is possible to efficiently distribute frequency resources for small base station(s) in a wireless communication system in which the small base station(s) are disposed.

In addition, according to embodiment(s) of the present invention, it is possible to efficiently search for or measure a cell (base station) of a user equipment (UE) connected to or to be connected to small base station(s).

Effects that may be obtained from the present invention are not limited to the above-mentioned effects, and other effects not mentioned herein may be clearly understood by those skilled in the art from description below.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
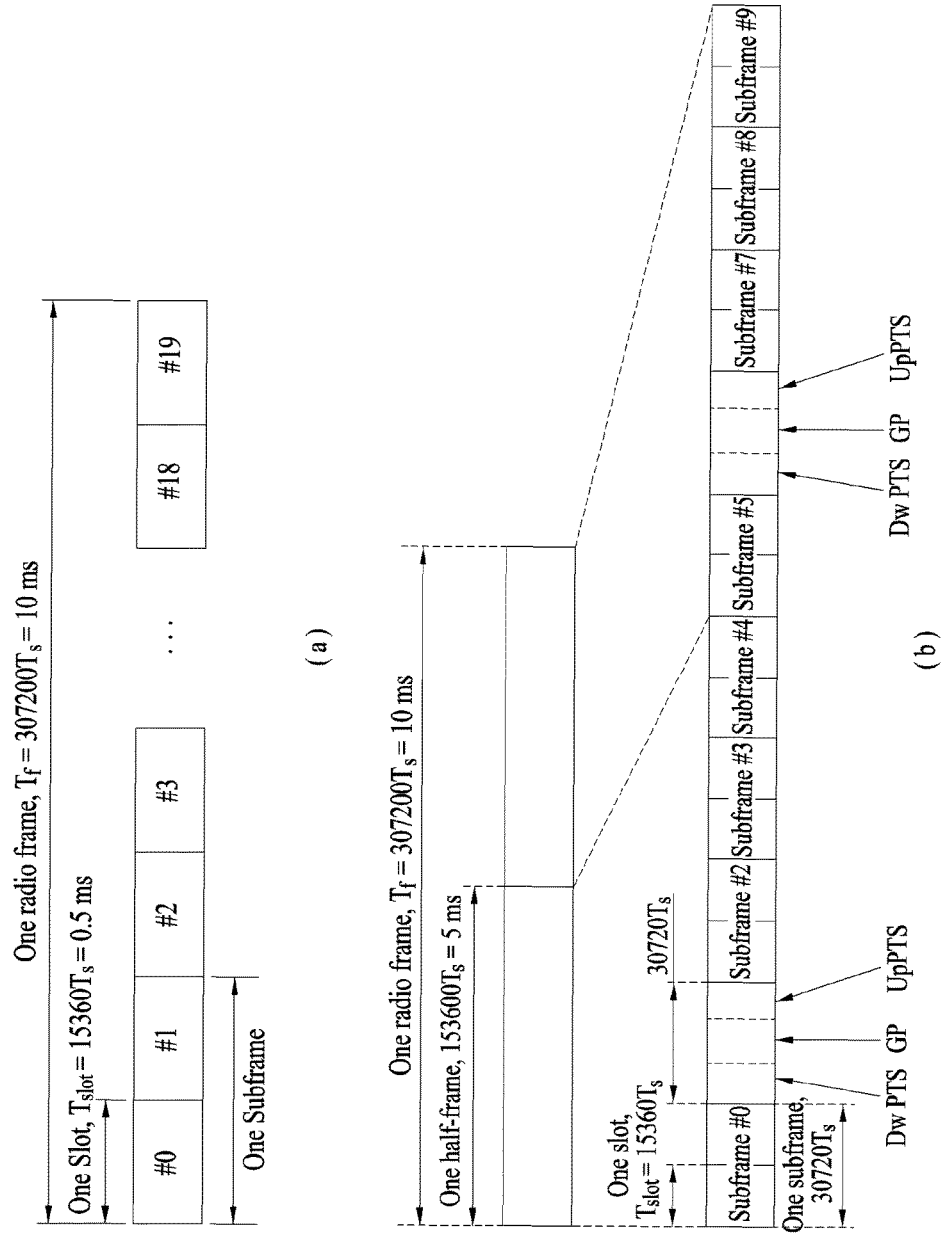
FIG. 1 is a diagram illustrating an example of a structure of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

The following technique, apparatus and system is applicable to various wireless multiple access systems. For convenience of description, assume that the present invention is applied to 3GPP LTE(-A). However, the technical features of the present invention are not limited thereto. For example, although the following detailed description is made in detail on the assumption that a mobile communication system is a 3GPP LTE(-A) system, it is applicable to other prescribed mobile communication systems by excluding unique items of the 3GPP LTE(-A) system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B ', 'evolved-Node B (eNB)', 'Base Transceiver System (BTS)', 'Access Point (AP)', 'processing Server (PS)', etc. In the following description, BS is commonly called eNB.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

In addition, in the present invention, a CRS (Cell-specific Reference Signal)/DMRS (Demodulation Reference Signal)/CSI-RS (Channel State Information Reference Signal) time-frequency resources (or REs) refer to time-frequency resources (or REs) carrying CRS/DMRS/CSI-RS, REs allocated to CRS/DMRS/CSI-RS or available REs. A subcarrier including a CRS/DMRS/CSI-RS RE is referred to as a CRS/DMRS/CSI-RS subcarrier and an OFDM symbol including a CRS/DMRS/CSI-RS RE is referred to as a CRS/DMRS/CSI-RS symbol. In addition, in the present invention, SRS time-frequency resources (or REs) refer to time-frequency resources (or REs) transmitted from a UE to a BS to carry a sounding reference signal (SRS) used for measurement of an uplink channel state formed between the UE and the BS. A reference signal (RS) refers to a predefined signal known to a UE and a BS and having a special waveform and is referred to as a pilot signal.

Meanwhile, in the present invention, a cell refers to a predetermined geographical region in which a BS, node(s) or antenna port(s) provide a communication service. Accordingly, in the present invention, communication with a specific cell may refer to communication with a BS, node or antenna port for providing a communication service to the specific cell. In addition, a downlink/uplink signal of a specific cell refers to a downlink/uplink signal from/to a BS, node or antenna port for providing a communication service to the specific cell. In addition, channel state/quality of a specific cell refers to channel state/quality of a channel or communication link formed between a UE and a BS, node or antenna port for providing a communication service to the specific cell.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
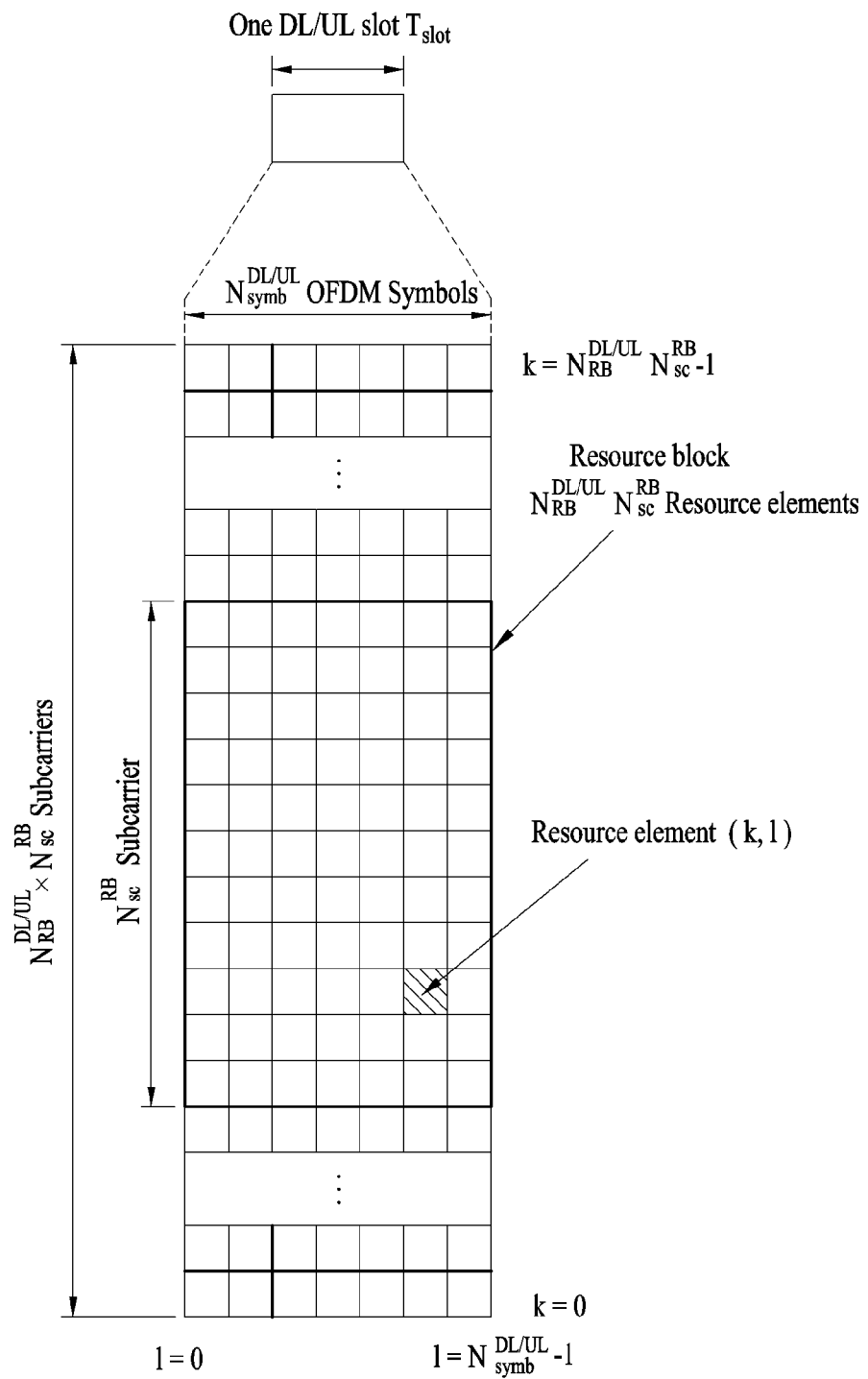
FIG. 2 is a diagram illustrating an example of a downlink/uplink (DL/UL) slot in the wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs thorough interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
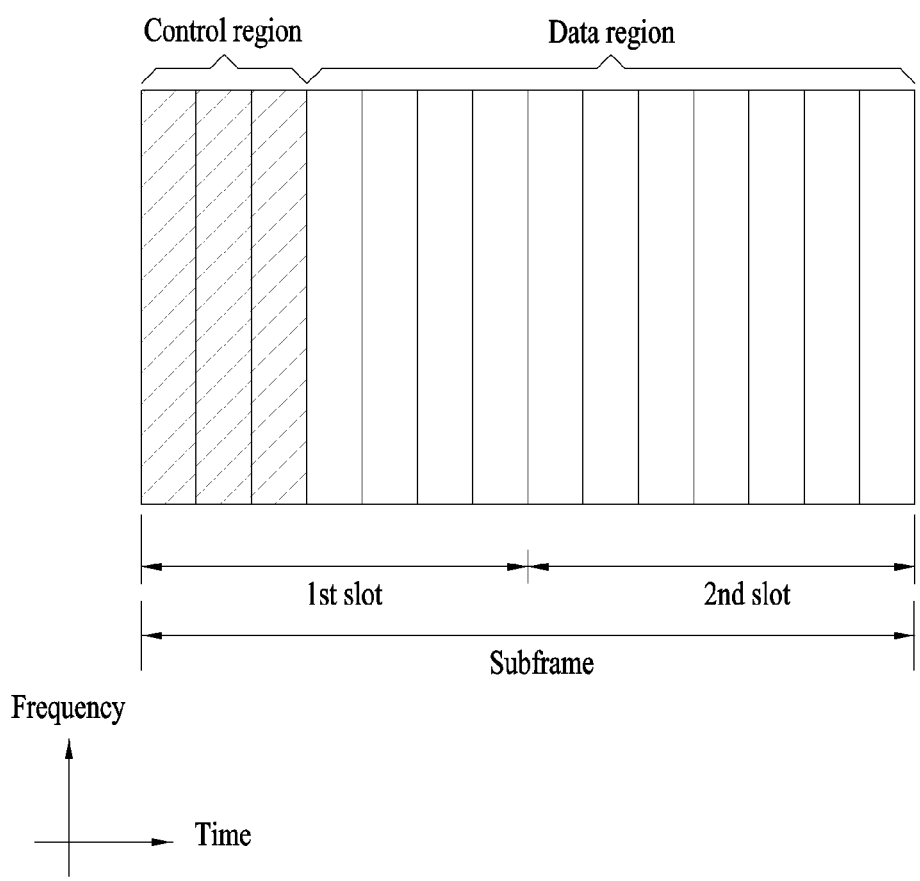
FIG. 3 is a diagram illustrating an example of a structure of a DL subframe used in a 3rd generation partnership project (3GPP) long term evolution-advanced (LTE-A) system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The size and purpose of DCI carried on a PDCCH depend on DCI format and the size thereof may be varied according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
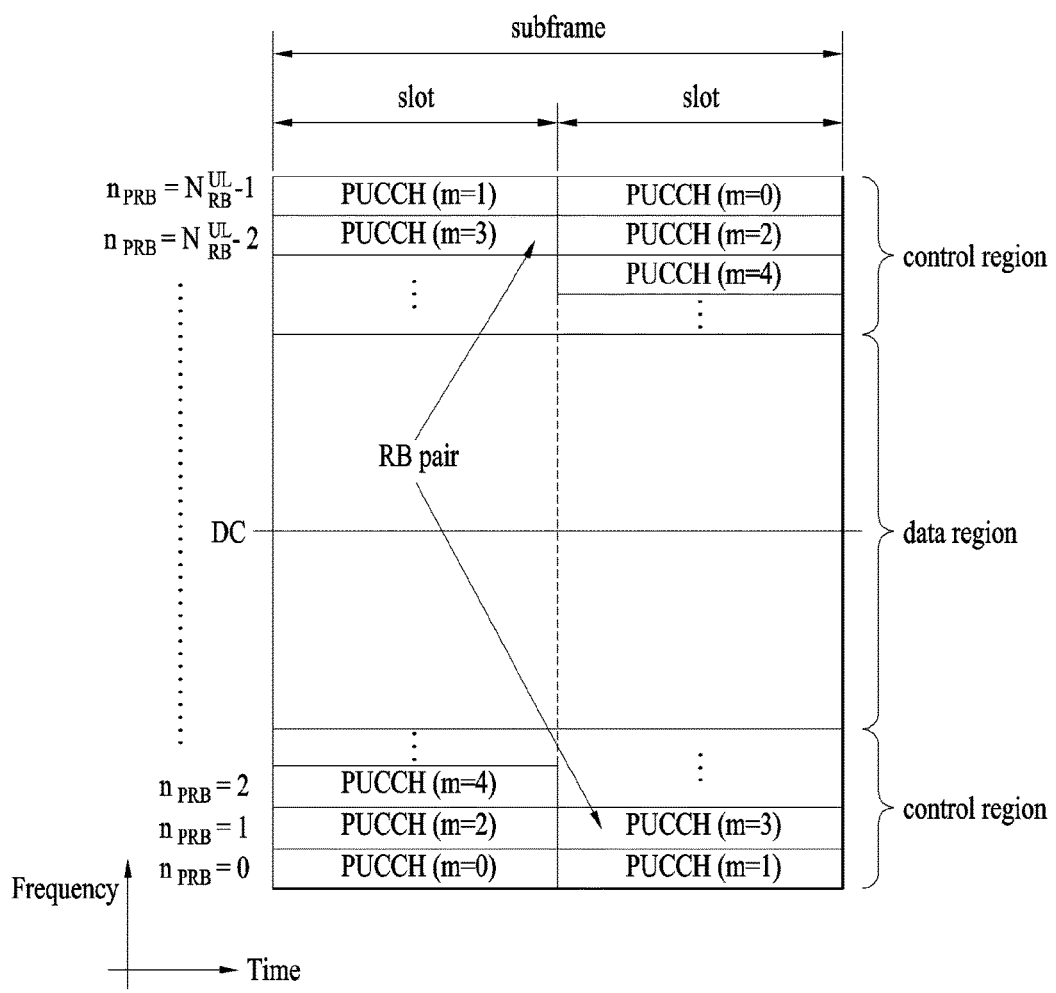
FIG. 4 is a diagram illustrating an example of a structure of a UL subframe used in the 3GPP LTE-A system.

FIG. 4 illustrates an exemplary structure of a UL subframe in the LTE system.

Referring to FIG. 4, a UL subframe may be divided into a control region and a data region in a frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency f0 in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |

TABLE 2-continued

| PUCCH format | Modulation scheme | Number of bits per subframe, $M_{bit}$ | Usage | Etc. |
|---|---|---|---|---|
| 3 | QPSK | 48 | ACK/NACK or SR + ACK/NACK or CQI/PMI/RI + ACK/NACK | |

Referring to Table 2, PUCCH format 1 series are mainly used to transmit ACK/NACK information, PUCCH format 2 series are mainly used to Channel State Information (CSI) such as CQI/PMI/RI, and PUCCH format 3 series are mainly used to transmit ACK/NACK information.

Reference signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
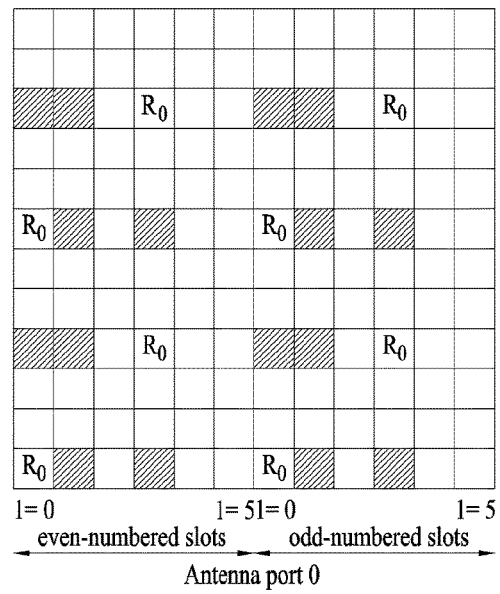
FIG. 5 is a diagram illustrating a mapping pattern of a cell-specific reference signal (CRS) according to an antenna port.
Figure 5:
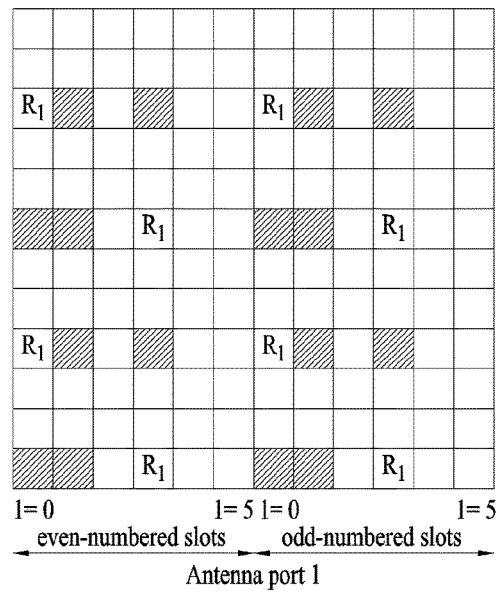
Figure 5:
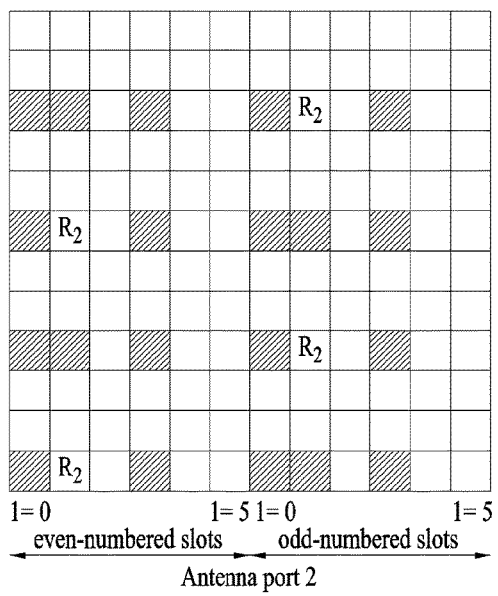
Figure 5:
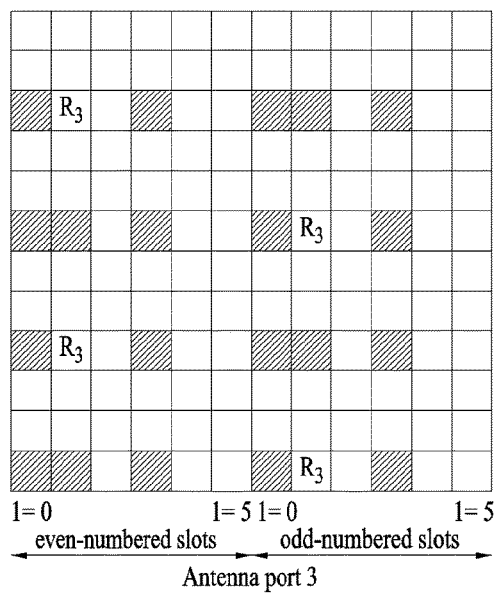

FIG. 5 illustrates CRS patterns for different antenna ports. CRS is used for two purposes, that is, channel information acquisition and data demodulation. A UE-specific RS is used only for data demodulation. CRS is transmitted in every subframe in a broad band and RSs are transmitted for up to 4 antenna ports according to the number of transmission antennas in an eNB.

For example, if an eNB has two transmission antennas, CRSs for antenna port 0 and antenna port 1 are transmitted. If the eNB has four transmission antennas, CRSs for antenna port 0 to antenna port 3 are transmitted respectively.

Figure 6:
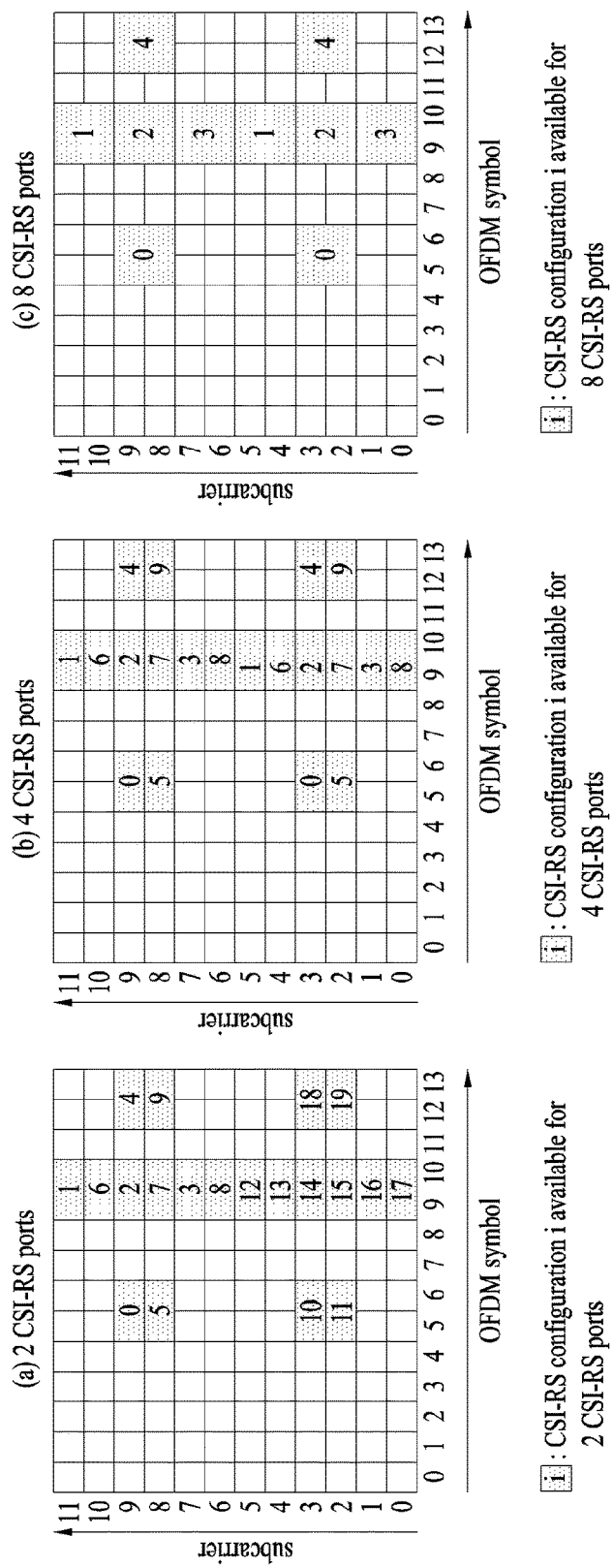
FIG. 6 is a diagram illustrating a mapping pattern of a channel state information-reference signal (CSI-RS) according to the antenna port.

FIG. 6 illustrates a CSI-RS mapping pattern. An antenna port through which a CSI-RS is transmitted is referred to as a CSI-RS port and positions of resources in a predetermined resource region in which corresponding CSI-RS(s) are transmitted through CSI-RS port(s) are referred to as a CSI-RS pattern or a CSI-RS configuration. In addition, a resource element (RE) used for CSI-RS transmission is referred to as a CSI-RS RE. While the position of an RE in which a CRS is transmitted per antenna port is fixed in the case of CRS, CSI-RS has a maximum of 32 different configurations in order to reduce inter-cell interference (ICI) in multi-cell environments including a hetero-network environment. CSI-RS configuration depends on the number of antenna ports in a cell and a CSI-RS is configured such that neighboring cells have different CSI-RS configurations. CSI-RS supports a maximum of 8 antenna ports (p=15, p=15, 16, p=15, . . . , 18 and p=15, . . . , 22), differently from CRS, and is defined for $\Delta f=15$ kHz only. Antenna ports p=15, . . . , 22 can respectively correspond to CSI-RS ports p=0, . . . , 7 in the following description.

FIG. 6 illustrates CSI-RS configurations. Particularly, FIG. 6 shows positions of resources occupied by CSI-RSs in an RB pair based on CSI-RS configurations.

FIG. 6(a) illustrates 20 CSI-RS configurations available for 1 or 2 CSI-RS ports, FIG. 6(b) illustrates 10 CSI-RS configurations available for 4 CSI-RS ports and FIG. 6(c) illustrates 5 CSI-RS configurations available for 8 CSI-RS ports. Each CSI-RS configuration may be assigned a number based on the number of CSI-RS ports.

If the BS configures two antenna ports for transmitting CSI-RS, that is, if 2 CSI-RS ports are configured, the 2 CSI-RS ports perform transmitting CSI-RS on radio resources corresponding to one of 20 CSI-RS configurations depicted in FIG. 6(a). When the number of CSI-RS ports configured for a specific cell is 4, the 4 CSI-RS ports transmit CSI-RSs on resources of a CSI-RS configuration for the specific cell from among the 10 CSI-RS configurations shown in FIG. 6(b). When the number of CSI-RS ports configured for a specific cell is 8, the 8 CSI-RS ports transmit CSI-RSs on resources of a CSI-RS configuration for the specific cell from among the 4 CSI-RS configurations shown in FIG. 6(c).

CSI-RS configurations have a nested property. The nested property is that a CSI-RS configuration for a larger number of CSI-RS ports is a super set of a CSI-RS configuration for a small number of CSI-RS ports. Referring to FIGS. 6(a) and 6(b), REs corresponding to a CSI-RS configuration for 4 CSI-RS ports are included in REs corresponding to a CSI-RS configuration for 8 CSI-RS ports, for example.

A plurality of CSI-RSs can be used in a predetermined cell. In the case of non-zero power CSI-RS, only a CSI-RS for one configuration is transmitted. In the case of zero power CSI-RS, CSI-RSs for a plurality of configurations can be transmitted. A UE assumes zero transmit power for resources other than resources assumed to be non-zero power CSI-RSs, from among resources corresponding to zero power CSI-RSs. For example, a CSI-RS is not transmitted in a special subframe in which downlink transmission and uplink transmission coexist, a subframe in which a paging message is transmitted and a subframe in which transmission of a synchronization signal and a PBCH (physical broadcast channel) or SIB1 (system information block type 1) collides with transmission of a CSI-RS in a radio frame for TDD, and the UE assumes that a CSI-RS is not transmitted in these subframes. A time-frequency resource used by a CSI-RS port for CSI-RS transmission is not used for PDSCH transmission through any antenna port and is not used for CSI-RS transmission through an antenna port other than the CSI-RS port.

Since time-frequency resources used for CSI-RS transmission cannot be used for data transmission, throughput decreases as CSI-RS overhead increases. In view of this, CSI-RS is configured such that the CSI-RS is transmitted at a predetermined interval corresponding to a plurality of subframes instead of being configured such that the CSI-RS is transmitted in every subframe. In this case, CSI-RS transmission overhead can be remarkably reduced. In the following description, a subframe configured for CSI-RS transmission is referred to as a CSI-RS subframe.

The BS can inform a UE of the following parameters through higher layer signaling (e.g. medium access control (MAC) signaling or radio resource control (RRC) signaling).

Number of CSI-RS ports
CSI-RS configuration
CSI-RS subframe configuration
CSI-RS subframe configuration period TCSI-RS
CSI-RS subframe offset $\Delta_{CSI-RS}$ The BS can inform the UE of a CSI-RS configuration transmitted with zero power and a subframe configuration for transmission of a zero power CSI-RS as necessary.

Figure 7:
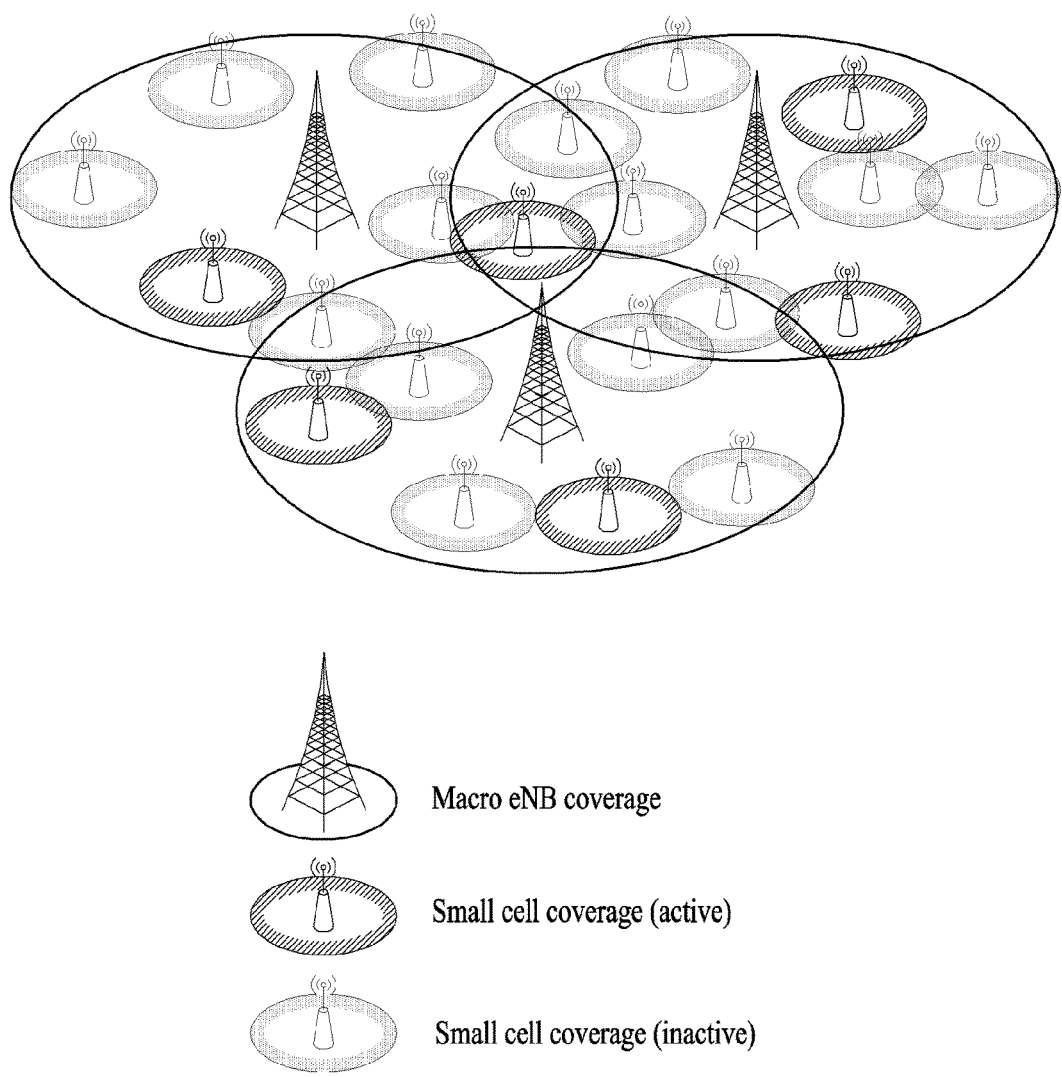
FIG. 7 is a diagram illustrating a wireless communication environment related to an embodiment of the present invention.

FIG. 7 illustrates a wireless communication system related to embodiments of the present invention. FIG. 7 illustrates a heterogeneous network (HetNet) in which small cells (for example, pico cells, femto cells, etc.) are densely deployed in a coverage area of a macro cell.

Small cell base stations may simultaneously transmit and receive signals in the same frequency band. To this end, a plurality of antennas is provided. Here, some of the antennas may be used to receive signals, and the other antennas may be used to transmit signals. In general, in order to allow base stations to simultaneously transmit and receive signals in the same frequency band, a distance between a transmit antenna and a receive antenna needs to be sufficiently large such that a signal delivered from the transmit antenna does not interfere with the receive antenna, and a receiver preferably has a function of removing a transmitted signal. In other words, in an FDD system, the small cell base stations need to be allowed to simultaneously transmit and receive signals in a DL frequency band. In other words, a small cell base station may use a DL frequency band to transmit a signal to a UE connected thereto and another small cell base station and receive a signal from a macro cell base station or another small cell base station. On the other hand, in a TDD system, the small cell base stations need to be allowed to simultaneously transmit and receive signals in one DL time slot. Even though embodiments of the present invention are suitable for a base station that has a function of simultaneously transmitting and receiving signals in the same frequency band, the embodiments may be applied to a base station that uses time division to transmit and receive signals in the same frequency band.

The small cell base stations share the same bandwidth of the same frequency (carrier frequency). Therefore, the small cell base stations may measure a DL interference level (for example, received signal strength of a particular DL signal, etc.) in a particular frequency band, and determine whether the small cell base stations may use the frequency band based on a result of measurement.

In other words, when a DL interference level measured by a small cell base station is less than or equal to a certain level, the small cell base station may determine that a corresponding frequency can be used at a corresponding point in time, and transmit a control signal and a reference signal (RS) (for example, a tracking RS (TRS)) for a basic service. On the other hand, when there is no traffic load or there is no UE to be served, the small cell base station may suspend signal transmission for a certain period of time, and enter an idle or standby state, or a power save mode. In this instance, transmission of any type of control signal and RS in addition to data is suspended. Referring to FIG. 7, in general, a small cell (coverage) and a base station thereof indicated by "active" refer to a small cell and a base station thereof communicating through UL/DL, and a small cell (coverage) and a base station thereof indicated by "inactive" refer to a small cell and a base station thereof entering the power save mode.

In this specification, the TRS is an RS used by a UE for minimum cell acquisition and tracking, and may correspond to an RS used by the UE for mobility and radio resource measurement (RRM)/radio link monitoring (RLM). A pattern of the TRS needs to be agreed upon between the base station and the UE and known to the base station and the UE. The pattern may be simply the same as a pattern of the CRS in the legacy LTE(-A) system, and a specific resource allocation location may be calculated through a cell identifier (ID). To reduce transmission overhead, the TRS may be transmitted once every M subframes rather than being transmitted in each subframe. For example, the pattern of the TRS may be determined as follows.

Frequency shift=cell ID mod 6
TRS transmission offset=K (K is a single frequency network (SFN) number or a subframe number)
TRS transmission period=SFN mod M or subframe number mod M (M being an integer)

The TRS transmission offset or the TRS transmission period may be previously agreed through upon an interface between small base stations. Alternatively, to reduce inter-TRS interference, the TRS transmission subframe may be determined by a function of a cell ID.

The embodiment(s) of the present invention presume that densely disposed small base stations are all synchronized for each area. For example, it is presumed that small base stations located within a coverage area of the same macro cell are synchronized with each other. In addition, a basic primary synchronization signal/secondary synchronization signal (PSS/SSS) for cell search is transmitted by all small cells in a corresponding area at the same time-frequency resource location using an SFN scheme. In other words, upon initially receiving power, a small cell base station first detects the PSS/SSS in a DL frequency band to time-synchronize with the macro cell or other small cell base stations. A sequence of the PSS/SSS to be detected by the small cell base stations is determined by a cell ID previously provided by an operator. The operator allocates the same cell ID to small cell base stations in a certain area. The small cell base stations in the certain area to which the same cell ID is allocated transmit the same PSS/SSS at the same point in time.

The small cell base stations transmit a TRS as an RS for continuous acquisition of time-frequency resources in addition to transmitting the PSS/SSS. In this instance, a whole system band may be divided into a plurality of subbands, and the TRS may be transmitted in each SB. In this case, when a particular small cell base station transmits a TRS in a particular SB, it means that the SB is used by the small cell base station. In other words, different small cell base stations may transmit the TRS in the respective SBs. However, in order to prevent increase in complexity in a cell search process of the UE, all small cell base stations may transmit a PSS/SSS/TRS using the same cell ID.

In addition, a TRS may be transmitted as an RS for continuous acquisition of time-frequency resources in addition to transmission of the PSS/SSS. In this instance, each small cell may transmit the TRS in a whole system band. In this case, measurement for verifying whether another cell is present may be performed using a CSI-RS, and the CSI-RS may be transmitted in each SB. In this case, when a particular small cell base station transmits a CSI-RS in a particular SB, it means that the SB is used by the small cell base station. While all small cell base stations transmit PSS/SSS/TRSs using the same cell ID, the CSI-RS may be transmitted using a different cell ID for each small cell base station or each SB.

A synchronization signal (SS) is transmitted in a 6RB based on a center frequency similarly to the legacy LTE(-A) system. Thereafter, the UE needs to acquire information about a whole system bandwidth and a size of an SB through detection/decoding of a PBCH. The PBCH is similarly transmitted in a 6RB based on the center frequency, and system information commonly used by small cell base stations that share the same cell ID is delivered as information transmitted on the PBCH. In addition, transmission information such as the TRS transmission period, the TRS transmission offset, etc. needs to be included in the PBCH in order to receive the TRS transmitted by each small cell base station in each SB. The respective SBs need to have the same TRS pattern, and the TRS pattern needs to be identified by the UE through a combination of information transmitted on the PBCH and a cell ID.

The UE first detects the PSS/SSS transmitted in the 6RB based on the center frequency to obtain information about a boundary between a radio frame and a subframe, a length of a CP, a cell ID, etc., and detects/decodes the PBCH. When information about the whole system bandwidth, the size of the SB, and the number of SBs is obtained, the UE performs measurement for each SB. A basic unit (resolution) for DL resource allocation of the UE may vary depending on the whole system bandwidth, the size of the SB, and the number of SBs. As the size of the SB decreases and the number of SBs increases, the basic unit for DL resource allocation may further decrease.

Then, the UE receiving/measuring the TRS or the CSI-RS in the particular SB determines that the small cell base station is present in the SB, and transmits a random access channel (RACH) signal in the SB. Here, the RACH signal may correspond to a signal for random access (RA), for example, an RA preamble. Meanwhile, the UE may select an SB for transmission of the RACH signal. For example, the UE may select an SB having the best received signal quality among measured SBs. Upon receiving the RACH signal, a particular small cell base station operating in the SB transmits a random access response (RAR) to the UE. In this instance, the small cell base station provides a seed (for example, a physical ID of the small cell (base station)) used for data scrambling. When the UE and the small cell base station exchange data after the RACH procedure, the cell ID received through the RAR is used. Here, the cell ID used when the small cell base station transmits the PSS/SSS/PBCH and the TRS may be different from the cell ID used when the particular small cell base station scrambles data in the particular SB. In this specification, a cell ID used for PSS/SSS/PBCH scrambling and a TRS sequence is referred to as a common cell ID, and a cell ID used when a small cell base station scrambles data is referred to as a dedicated cell ID.

Here, the TRS is a pseudorandom sequence, and an initial value of the sequence is determined by a cell ID. The TRS sequence may be determined as the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad [\text{Equation 1}]$$

$$m = 0, 1, \ldots, 2N_{RB}^{max,DL} - 1$$

Here, $n_s$ denotes a slot number in one radio frame, and l denotes an OFDM slot number in the slot. In addition, a pseudorandom sequence c(i) may be defined by a length-31 gold sequence. An output sequence c(n) having a length of $M_{PN}$ (here, n=0, 1, . . . , $M_{PN}$−1) may be defined by the following equation.

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad [\text{Equation 2}]$$

Here, $N_c$=1600, and a first m-sequence is initialized to $x_1(0)$=1, $x_i(n)$=0, n=1, 2, . . . , 30. Initialization of a second m-sequence is expressed by the following equation which has a value depending on application of the sequence.

$$c_{init} = \sum_{i=0}^{30} x_2(i) \cdot 2^i \quad [\text{Equation 3}]$$

In Equation 1, a pseudorandom sequence generator is initialized by an equation below when each OFDM symbol starts. In the equation below, $N_{ID}^{cell}$ denotes the cell ID.

$$c_{init} = \quad [\text{Equation 4}]$$
$$2^{10} \cdot (7 \cdot (n_s + 1) + l + 1) \cdot (2 \cdot N_{ID}^{cell} + 1) + 2 \cdot N_{ID}^{cell} + N_{CP}$$
$$N_{CP} = \begin{cases} 1 & \text{for normal } CP \\ 0 & \text{for extended } CP \end{cases}$$

Figure 8:
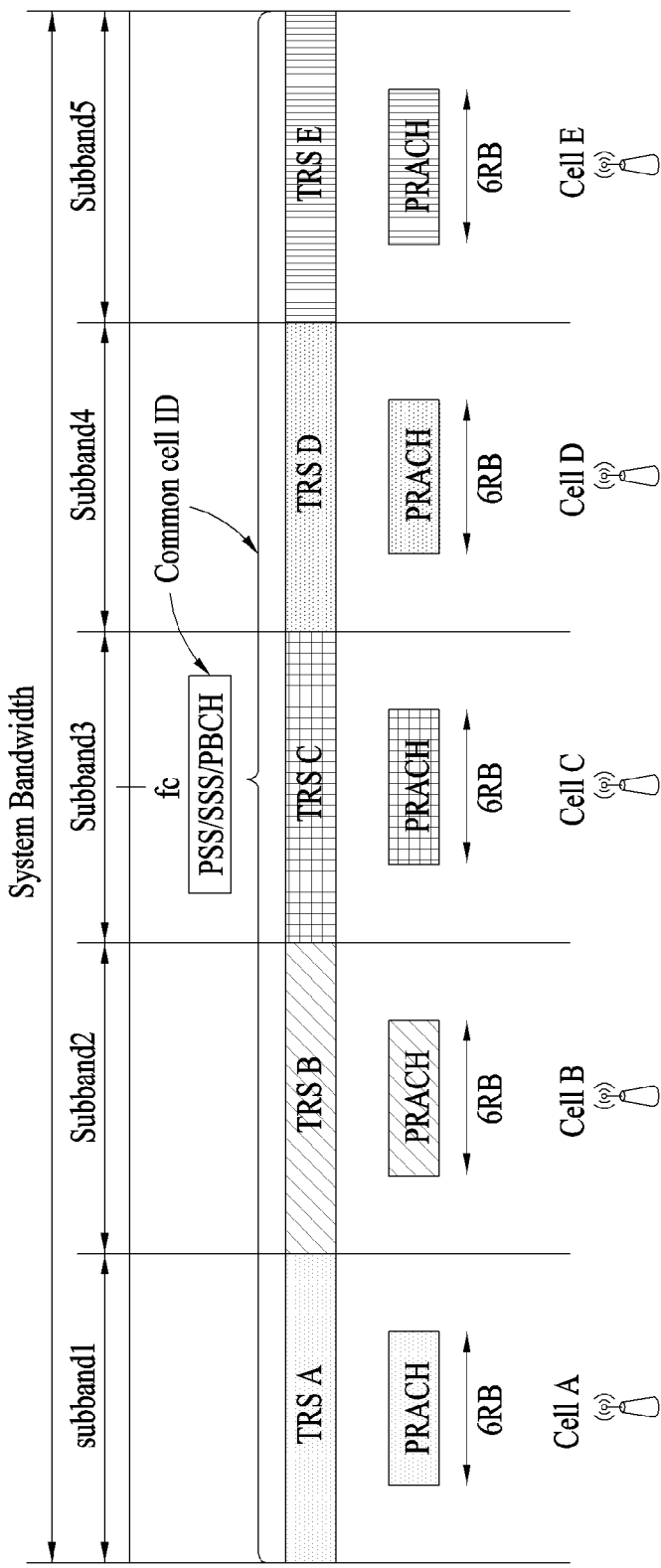
FIG. 8 is a diagram illustrating an example of use of a frequency band related to an embodiment of the present invention.

FIG. 8 illustrates an example of use of a frequency band related to an embodiment of the present invention. Referring to FIG. 8, a PSS/SSS/PBCH is transmitted in a 6RB based on a center frequency of a whole system bandwidth, and a common cell ID is used for transmission of the PSS/SSS/PBCH and a TRS. In FIG. 8, the TRS is illustrated as an SB TRS (in other words, different TRSs are transmitted in respective SBs). However, while an individual small cell base station, which corresponds to an entity that transmits the TRS, transmits the TRS using an SB as a unit, a sequence of the TRS transmitted by each small cell base station in one different SB is generated by the common cell ID and transmitted. Therefore, a UE receiving the sequence recognizes that a wideband (WB) TRS is transmitted. In other words, a seed for generation of the TRS sequence or an allocation location of the TRS does not change for each SB, and thus the UE recognizes the sequence as a TRS transmitted by one base station (cell) and receives the sequence. A UE that receives a TRS in a particular SB may transmit a PRACH preamble in M (M=6 in FIG. 8) arbitrary RBs in each SB. An RAR transmitted from a small cell base station is transmitted and received through an RB used for transmission of the PRACH preamble, and UL/DL transmission and reception for a subsequent random access procedure are performed through the RB.

Figure 9:
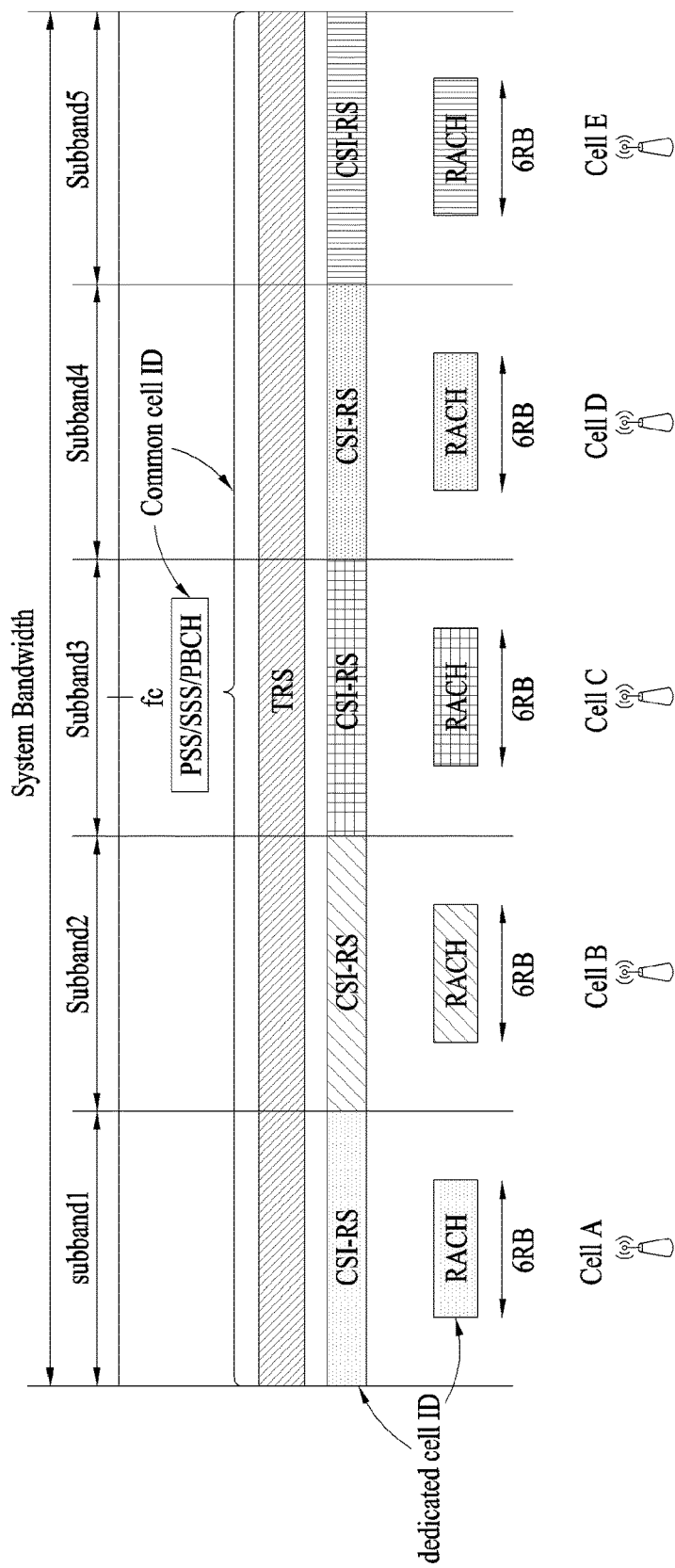
FIG. 9 is a diagram illustrating another example of use of a frequency band related to an embodiment of the present invention.

FIG. 9 illustrates another example of use of a frequency band related to an embodiment of the present invention. Unlike FIG. 8, in the embodiment related to FIG. 9, each small cell base station transmits a WB TRS, and particularly transmits an SB CSI-RS.

A detailed description will be given of embodiment(s) of the present invention for each operation.

1. Example of Sensing and Measurement for Different Small Cell Base Station(s)

As mentioned above, each small cell base station includes a plurality of antennas, some of which may be used for data transmission and the others of which may be used for signal reception to measure interference or sense carriers. Interference measurement and carrier sensing may be commonly used as similar concepts in this specification.

Each small cell base station may attempt sensing for each SB to verify whether each SB is available.

When a Measured Interference Level is used

In this instance, interference of an arbitrary level may be sensed or measured.

In other words, a particular small cell base station may determine whether the SB is available based on an energy level of interference received at a receive antenna thereof through carrier sensing in a particular SB. When the energy level is less than or equal to a certain level, the small cell base station may determine that the SB is available and use the SB. The interference energy level may be measured through carrier sensing in all SBs in a band. In this instance, when an SB in which the interference energy level is less than or equal to the certain level is detected, measurement in remaining SBs may be suspended. On the other hand, when the energy level exceeds the certain level, the small cell base station may determine that another small cell base station is in operation in the SB, and wait until a subsequent sensing interval.

As another scheme, the small cell base station may verify whether the SB is available based on interference obtained by measuring an object to be sensed/measured on a particular resource. Specifically, the small cell base station may separately configure a resource for measurement of interference in each SB. The separately configured resource is referred to as a sensing resource. Information about a configuration, a location, etc. of a sensing resource for each SB needs to be exchanged between small cell base stations in advance. Alternatively, the sensing resource used by the small cell base station to measure interference may be fixed as an RE location in a particular subframe of one SB, and a subframe location of the sensing resource may be determined by a function of SFN. An example is given below.

Sensing resource generation offset=K (K being an SFN number)

Sensing resource generation period=SFN mod M (M being an integer)

Meanwhile, even when traffic load temporarily decreases and there is no data to be transmitted on DL, if a particular small cell base station that currently occupies SB N (N being an integer) desires to further occupy the SB for a while, dummy data may be transmitted on a sensing resource in the SB such that another small cell base station may not use/occupy the SB.

As another scheme for verifying whether another small cell base station operates in each SB, it is possible to measure a beacon signal transmitted by the other small cell base station. Examples of the beacon signal may include a TRS or a CSI-RS.

When the TRS is used as an example of the beacon signal

When a TRS is received in a particular SB, a small cell base station may determine that another small cell base station currently uses the SB, and wait until a subsequent TRS transmission period. When a TRS of another small cell base station is not measured or measured to be less than or equal to a certain level in the particular SB, the small cell base station transmits a TRS in the SB, thereby starting to use the particular SB. Information about a TRS transmission location and a TRS transmission period for each SB may be provided by a PBCH. In this instance, the TRS transmission location and the TRS transmission period may differ between SBs or be the same in all SBs.

In this case, received signal strength, etc. of a TRS may be measured in all SBs in a band. When an SB, received signal strength of which is less than or equal to a certain level, is detected, measurement in the other SBs may be suspended.

When the CSI-RS is used as an example of the beacon signal

A small cell base station may receive a CSI-RS in a particular SB, and thus determine that another small cell base station currently uses the SB, and wait until a subsequent CSI-RS transmission period. When a CSI-RS of another small cell base station is not measured or measured to be less than or equal to a certain level in the particular SB, the small cell base station transmits a CSI-RS in the SB, thereby starting to use the SB. In this case, received signal strength, etc. of a CSI-RS may be measured in all SBs in a band. When an SB, received signal strength of which is less than or equal to a certain level, is detected, measurement in the other SBs may be suspended.

Information about a CSI-RS transmission location and a CSI-RS transmission period for each SB may be provided by a PBCH. In this instance, the CSI-RS transmission location and the CSI-RS transmission period may differ between SBs or be the same in all SBs.

The CSI-RS is a pseudorandom sequence, which may be initialized by a dedicated cell ID or a separate cell-specific or SB-specific value rather than a common cell ID. When the CSI-RS is used to measure whether another small cell base station is present, a seed value that initializes a CSI-RS sequence may be configured as the same value for all SBs, for example, a common cell ID. Alternatively, the PBCH may previously provide a seed value available for initialization of the CSI-RS sequence for each SB.

$$r_{l,n_s}(m) = \frac{1}{\sqrt{2}}(1 - 2 \cdot c(2m)) + j\frac{1}{\sqrt{2}}(1 - 2 \cdot C(2m+1)), \quad \text{[Equation 5]}$$
$$m = 0, 1, \ldots, N_{RB}^{max,DL} - 1$$

In addition, the CSI-RS sequence may be initialized by the following equation.

$$c_{init} = \quad \text{[Equation 6]}$$
$$2^{10} \cdot (7 \cdot (n_s + 1) + l + 1) \cdot (2 \cdot N_{ID}^{CSI} + 1) + 2 \cdot N_{ID}^{CSI} + N_{CP}$$
$$N_{CP} = \begin{cases} 1 & \text{for normal } CP \\ 0 & \text{for extended } CP \end{cases},$$

A pseudorandom sequence generator of Equation 5 is initialized by an equation below when each OFDM symbol starts. In the equation below, $N_{ID}^{CSI}$ denotes the common cell ID or the dedicated cell ID. In this case, a transmission period/offset of the CSI-RS and $N_{ID}^{CSI}$ need to be delivered to a UE in advance and, for example, may be transmitted through the PBCH.

2. Operation of Small Cell Base Station

A small cell base station starting to operate in a particular SB may transmit a TRS in the particular SB, and transmit a PSS/SSS thereof in a 6RB based on a center frequency of a system bandwidth. In this specification, it is presumed that densely disposed small cell base stations share the same cell ID, and transmit the PSS/SSS using an SFN scheme based on the same cell ID. The small cell base station may first acquire the common cell ID by detecting the PSS/SSS of 6RB, and decode a PBCH to obtain information about a whole system bandwidth, a size of an SB, and the number of SBs. In other words, information about a system bandwidth, the number of TRS ports, a size of SB/the number of SBs, an SFN, etc. needs to be included in the PBCH. A UE may acquire a TRS pattern and the SFN by detecting the PBCH.

In addition, when a small cell base station performs sensing for another small cell base station or a UE performs sensing for a connectable or accessible small cell base station, using an SB CSI-RS (that is, the above-described CSI-RS transmitted using an SB as a unit), the PBCH may include a cell ID of each small cell base station.

A small cell base station desiring to start initial transmission performs sensing for each SB. When a particular SB is determined to be available, the small cell base station transmits a TRS in the SB or all bands (WB), and transmits a PSS/SSS and a PBCH in a 6RB based on a center frequency of a system bandwidth. When the particular SB is determined to be available, sensing of remaining SBs may be suspended. In this instance, the PBCH corresponds to zone-specific information and has a form in which a plurality of small cell base stations share the PBCH in a particular zone. In addition, when the SB CSI-RS is used for sensing, the small cell base station may transmit a CSI-RS in a corresponding SB based on a CSI-RS sequence generated using a cell ID thereof.

The small cell base stations perform sensing for all SBs using a certain period and pattern. When m antennas are allocated for sensing, the m antennas are used to perform sensing in a subframe in which sensing is performed, and the m antennas may be used for data transmission in a subframe in which sensing is not performed.

Small cell base stations not starting operation in any SB perform sensing for each SB in a subframe in which sensing is to be performed according to a sensing interval. When all SBs are occupied or used by another small cell base station, the small cell base stations may enter a power saving mode (for example, discontinuous reception (DRX) or discontinuous transmission (DTX)) until a subsequent sensing time.

A small cell base station that currently serves a UE in a particular SB may perform sensing for another SB in addition to the particular SB in a subframe in which sensing is to be performed. In particular, each small cell base station includes an antenna that may simultaneously perform transmission and reception, and thus may receive a TRS or a CSI-RS transmitted by another small cell base station in another SB.

When a small cell base station senses that interference in a particular SB is low while load or interference in a currently occupied or used SB is high, the small cell base station may move to the SB in which interference is low and operate. In this case, the small cell base station may instruct UEs connected thereto to perform SB switching. In other words, the small cell base station may instruct the UEs to switch to the particular SB at a certain time. The SB switching instruction may include information about locations and the number of SBs to move to and information about a switching time. The switching time may simply correspond to an nth subframe from a current frame or directly correspond to a subframe number.

When the small cell base station transmitting the SB switching instruction switches to a new SB, the small cell base station may suspend transmission of a TRS or a CSI-RS in a previous SB and restart transmission of the signal in the new SB. In the SB switching, an SB in which an RA procedure-related message is exchanged between the small cell base station and the UE, and an SB for transmission of the TRS or the CSI-RS are moved while the center frequency of the system bandwidth is maintained without change.

When the respective small cell base stations share the center frequency and the system bandwidth, and transmission of a DL data signal and a DL control signal is restricted to a particular SB, a CSI-RS needs to be restricted to SB transmission rather than WB transmission. A small cell base station provides a DL service to a UE only in a particular SB, and thus the UE receiving the service from the small cell base station merely needs to measure a CSI-RS in the corresponding SB, and the small cell base station only needs CSI feedback information for the SB. Therefore, transmission of the CSI-RS is restricted to a unit of SB, and a sequence of the CSI-RS may be generated using a dedicated cell ID or an SB-specific ID of the small cell base station.

3. Operation of Small Cell UE

A UE may detect a PSS/SSS transmitted in a 6RB based on a center frequency of a whole system bandwidth to acquire a boundary between a radio frame and a subframe, a length of a CP, a cell ID, etc., and detect/decode a PBCH. A cell ID substantially shared by a great number of small cell base stations may be regarded as a common cell ID, and a dedicated cell ID for scrambling for substantive data transmission/reception needs to be designated/operated for each small cell base station.

After obtaining information about the whole system bandwidth, a size of an SB and the number of SBs by detecting/decoding the PBCH, the UE may measure each SB according to a sensing and measurement scheme for the other small cell base stations described above. As mentioned above, each SB may be measured using general received signal strength, received signal strength (quality) of a TRS or a CSI-RS, etc.

Figure 10:
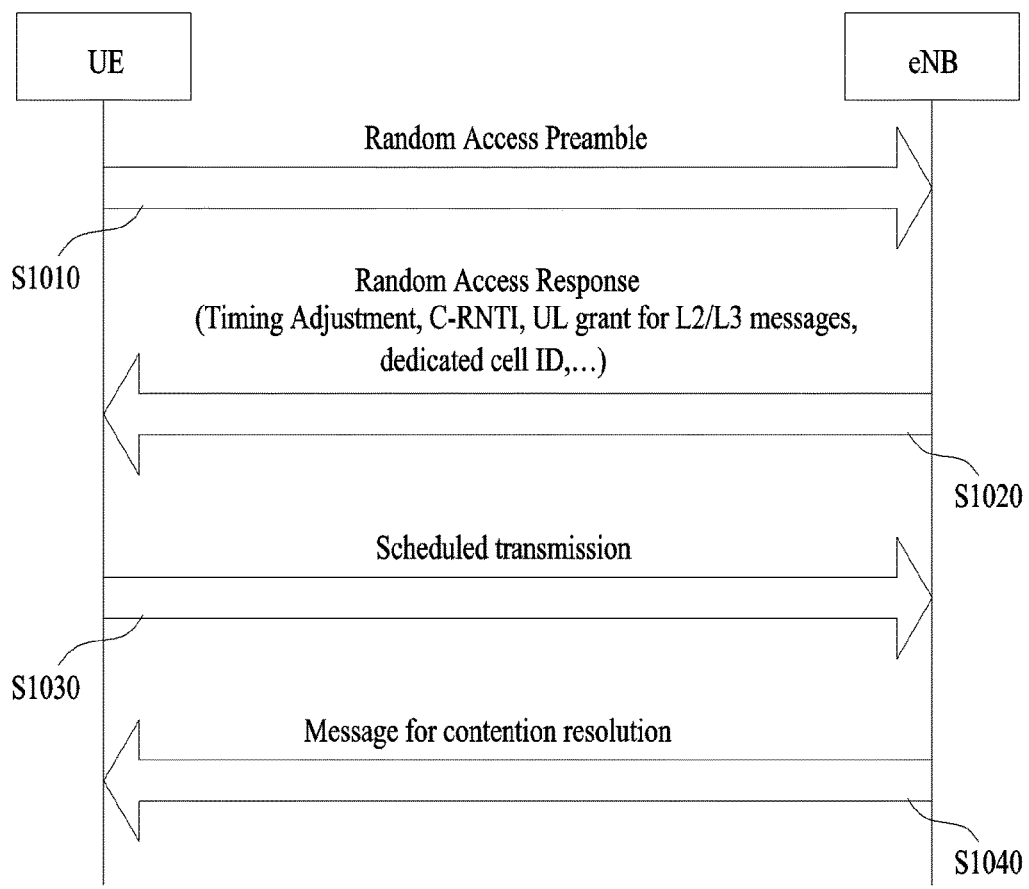
FIG. 10 is a diagram illustrating signaling and a procedure related to an embodiment of the present invention.

When a particular small cell base station is determined to occupy or use the SB as a result of measurement using each scheme, the UE may transmit an RA procedure-related signal (for example, a random access preamble) in an SB having the best channel state, that is, received signal strength, etc. The RA procedure is illustrated in FIG. 10. FIG. 10 illustrates a contention-based RA procedure.

For example, when a TRS is transmitted in each SB as in FIG. 8, a UE receiving/measuring the TRS in a particular SB may determine that the SB is occupied or used by a particular small cell base station, and transmit an RA preamble in an SB having the best TRS reception level among received/measured SBs (S1010). For example, as illustrated in FIG. 9, when a CSI-RS is transmitted in each SB while the TRS is transmitted in a WB, a UE receiving/measuring the CSI-RS in a particular SB may determine that the SB is occupied or used by a particular small cell base station, and transmit an RA preamble in an SB having the best CSI-RS reception level among received/measured SBs (S1010).

When the particular small cell base station occupying or using the particular SB receives the RA preamble from the UE, the particular small cell base station may transmit an RAR to the UE (S1020). In this instance, it is possible to provide a seed used by the particular small cell base station for data scrambling, that is, a dedicated cell ID of the particular small cell base station together with a UE ID allocated to the UE. Thereafter, the dedicated cell ID and the UE ID received through the RAR may be used when the UE and the small cell base station transmit/receive data. The UE may transmit a UL signal to the small cell base station using the dedicated cell ID and the UE ID (S1030), and the small cell base station may transmit a DL signal through a series of procedures (S1040) to report that contention of the RA procedure is resolved.

When the small cell base station that transmits the RAR operates in a plurality of SBs, the number and locations of the SBs in which the small cell base station operates may be transmitted in the RAR. In this case, data scrambling in the plurality of SBs may be performed by the same cell ID, that is, an ID of the small cell base station. Therefore, when the UE receives the RAR, the UE may receive a service in a plurality of SBs.

In addition, the UE may transmit an RA procedure-related message in a plurality of SBs, and receive the RAR from each of the SBs. In this instance, the UE may receive different dedicated cell IDs for the respective SBs and UE IDs allocated by different small cell base stations for the respective SBs, which means that the UE may receives services from different small cell base stations for the respective SBs, and a plurality of UE IDs may be used for data scrambling for the respective SBs. In other words, in this case, the UE may receive data scrambled by different seed values for the respective SBs. In this case, a control channel may be transmitted for each SB. Therefore, the UE needs to receive a plurality of control channels, and thus receive/decode a plurality of data channels.

Figure 11:
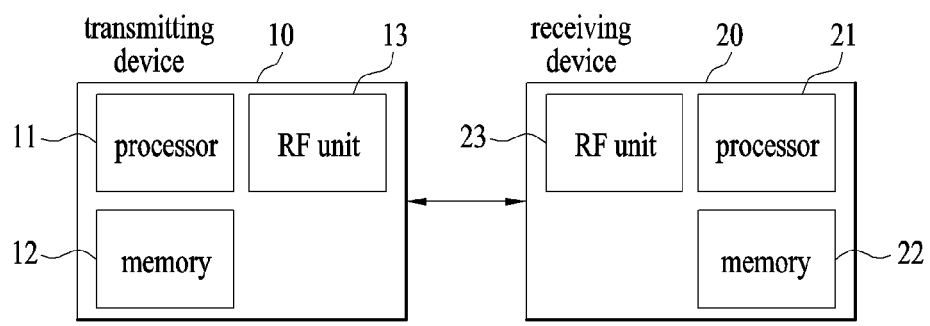
FIG. 11 is a block diagram illustrating an apparatus for implementing embodiment(s) of the present invention.

FIG. 11 is a block diagram of a transmitting device 10 and a receiving device 20 configured to implement exemplary embodiments of the present invention. Referring to FIG. 11, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

While the embodiments of the present invention have been described focusing on a receiving device operating on an uplink, the embodiments may be applied to a receiving device operating on a downlink The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention can be used for wireless communication systems such as a terminal, a base station, or other devices.

The invention claimed is:

1. A method of transmitting and receiving signals in at least one subband among a plurality of subbands which are divided from a system bandwidth on a single carrier frequency in a wireless communication system, the method being performed by a first pico base station located in a coverage area of a macro base station, the method comprising:
receiving beacon signals from other pico base stations deployed in the coverage area of the macro base station in one or more subbands of the plurality of subbands;
measuring reception qualities of the received beacon signals;
determining whether to select at least one subband from among the plurality of the subbands based on the measured reception qualities of the received beacon signals;
transmitting a physical broadcast channel (PBCH) and a beacon signal in the at least one subband when the at least one subband is selected,
wherein the PBCH carries information about a bandwidth of the whole band, a size of each subband and a number of subbands included in the whole band; and
transmitting, to at least one UE connected to the first pico base station, subband switching instruction information for instructing the at least one UE to switch to the at least one selected subband when the at least one selected subband is different from a subband in which the first pico base station has occupied for communication with the at least one UE,
wherein the subband switching instruction information includes information about the at least one selected subband, information about a number of the at least one selected subband and information about a time when to switch to the at least one selected subband, and
wherein the at least one selected subband is used for the first pico base station to transmit, to the at least one UE, channel state information-reference signals (CSI-RSs) generated using a dedicated cell identifier of the first pico base station or a subband-specific identifier.

2. The method according to claim 1, wherein the beacon signals include channel state information-reference signals (CSI-RSs).

3. The method according to claim 1, wherein the beacon signals are generated using a common cell identifier (ID) or a pico base station-specific cell ID.

4. The method according to claim 1, further comprising: receiving the beacon signals from the other pico base stations in the coverage area of the macro base station in all respective subbands of the whole band and measuring reception qualities of beacon signals received in all the respective subbands simultaneously with transmitting the beacon signal in the at least one selected subband.

5. The method according to claim 1, further comprising maintaining an idle state until a subsequent period in which the reception qualities of the beacon signals are to be measured when the at least one subband is not selected.

6. A pico base station configured to transmit and receive signals in at least one subband among a plurality of subbands which are divided from a system bandwidth on a single carrier frequency in a wireless communication system, comprising:
a radio frequency (RF) unit; and
a processor that:
controls the RF unit to receive beacon signals from other pico base stations deployed in the coverage area of the macro base station in one or more subbands of the plurality of subbands,
measures reception qualities of the received beacon signals,
determines whether to select at least one subband from among the plurality of subbands based on the measured reception qualities of the beacon signals,
controls the RF unit to transmit a physical broadcast channel (PBCH) and a beacon signal in the at least one subband when the at least one subband is selected,
wherein the PBCH carries information about a bandwidth of the whole band, a size of each subband and a number of subbands included in the whole band, and
controls to the RF unit to transmit, to at least one UE connected to the first pico base station, subband switching instruction information for instructing the at least one UE to switch to the at least one selected subband when the at least one selected subband is different from a subband in which the first pico base station has occupied for communication with the at least one UE,
wherein the subband switching instruction information includes information about the at least one selected subband, information about a number of the at least one selected subband and information about a time when to switch to the at least one selected subband, and wherein the at least one selected subband is used for the first pico base station to transmit, to the at least one UE, channel state information-reference signals (CSI-RSs) generated using a dedicated cell identifier of the first pico base station or a subband-specific identifier.

* * * * *